US008455825B1

(12) United States Patent
Cranton et al.

(10) Patent No.: US 8,455,825 B1
(45) Date of Patent: Jun. 4, 2013

(54) OPTO-MECHANICAL INFRARED THERMAL VIEWER DEVICE

(76) Inventors: Brian W. Cranton, Sanbornton, NH (US); Francis P. Pantuso, Manchester, NH (US)

( * ) Notice: Subject to any disclaimer, the term of this patent is extended or adjusted under 35 U.S.C. 154(b) by 826 days.

(21) Appl. No.: 12/548,827

(22) Filed: Aug. 27, 2009

Related U.S. Application Data

(60) Provisional application No. 61/092,541, filed on Aug. 28, 2008.

(51) Int. Cl.
*H01L 25/00* (2006.01)

(52) U.S. Cl.
USPC .......................................................... 250/332

(58) Field of Classification Search
USPC ............... 250/330, 336.1, 338.1, 347, 358.1, 250/370.01, 215, 472.1, 550; 356/458, 457, 356/450; 348/771; 359/290, 291; 372/32
See application file for complete search history.

(56) References Cited

U.S. PATENT DOCUMENTS

| 3,553,460 | A | * | 1/1971 | Preston, Jr. ................... 250/550 |
| 4,464,052 | A | * | 8/1984 | Neumann ...................... 356/458 |
| 4,725,142 | A | * | 2/1988 | Sharnoff ....................... 356/458 |
| 5,424,866 | A | * | 6/1995 | Kikinis .......................... 359/292 |
| 2012/0127473 | A1 | * | 5/2012 | Pfaff .............................. 356/457 |

* cited by examiner

*Primary Examiner* — David Porta

(57) ABSTRACT

An imaging system allows a user to view thermal information about a scene by utilizing double-exposure holography or interferometry to determine the motion of an array of thermo-mechanical detector members.

28 Claims, 14 Drawing Sheets

I = Intensity of fringe as seen by interferometer/holography recording media

P = Position of the uCantilever beam

T = Scene temperature being imaged onto uCantilever beam by objective optics $T_{DE}$ = Temperature of uCantilever environment

REFERENCE PHASE IMAGE (1) AS CAPTURED BY INTERFEROMETER

ALTERED PHASE IMAGE (2) WHERE uCANTILEVERS 6 & 7 MOVED ONE WAY AND uCANTILEVERS 10 & 11 MOVED THE OTHER

MAP OF PHASE CHANGE BETWEEN (1) AND (2)

OPTO-MECHANICAL INFRARED THERMAL VIEWER DEVICE

CROSS-REFERENCE TO RELATED APPLICATIONS

This application claims the benefit of U.S. provisional patent application Ser. No. 61/092,541, filed Aug. 28, 2008. The entire disclosure of which is incorporated herein by reference in its entirety.

BACKGROUND OF THE INVENTION

Infrared (IR) thermal imagers used by military and law enforcement personnel allow the detection of radiation emitted by people and objects. These devices image thermal radiation, typically manifested as long wavelength infrared (LWIR) light in the 8-12 μm wavelength range, emitted from objects in a scene to create a visual thermal representation of that scene. Objects and backgrounds which are warm and/or have a high emissivity radiate more thermal energy than comparable cold and/or low emissivity objects and backgrounds, and when the differences in radiated thermal energy across a scene is imaged, an operator can passively gain significant information about the objects in the scene without the need for active or environmental illumination. Additionally, IR thermal imagers allow for the collection of information which might be unobtainable or difficult to obtain through other methods. For example, the user of a thermal imager might observe a car sized cold spot on otherwise warm pavement providing evidence that a car had recently been parked at that location shading that area from sunlight. No other general use, field deployable device would provide that type of information as quickly and conclusively as a thermal imager. Another advantage of infrared imagers is that they are less attenuated by smoke and dust. These devices may be monoculars, binoculars, bioculars and goggles; and may be hand-held, weapon mounted, vehicle mounted, tripod mounted or helmet mounted.

These devices may employ an uncooled microbolometer focal plane comprised of a two-dimensional array of detector elements sensitive to LWIR radiation that translates energy from the radiation into electric impulses that are communicated to signal processing electronics and translated into data for viewing on a display by an operator. Other sensor/detector technologies exist including cooled LWIR focal plan arrays, mid-wave infrared (MWIR) focal plane arrays, single axis scanning mirror systems with a linear bar thermal detector, and dual axis scanning mirror systems with a point thermal detector.

BRIEF DESCRIPTION OF THE DRAWINGS

For a better understanding of the invention, together with other objects, features and advantages, reference should be made to the following detailed description which should be read in conjunction with the following figures wherein like numerals represent like parts.

DETAILED DESCRIPTION

Figure 1A:
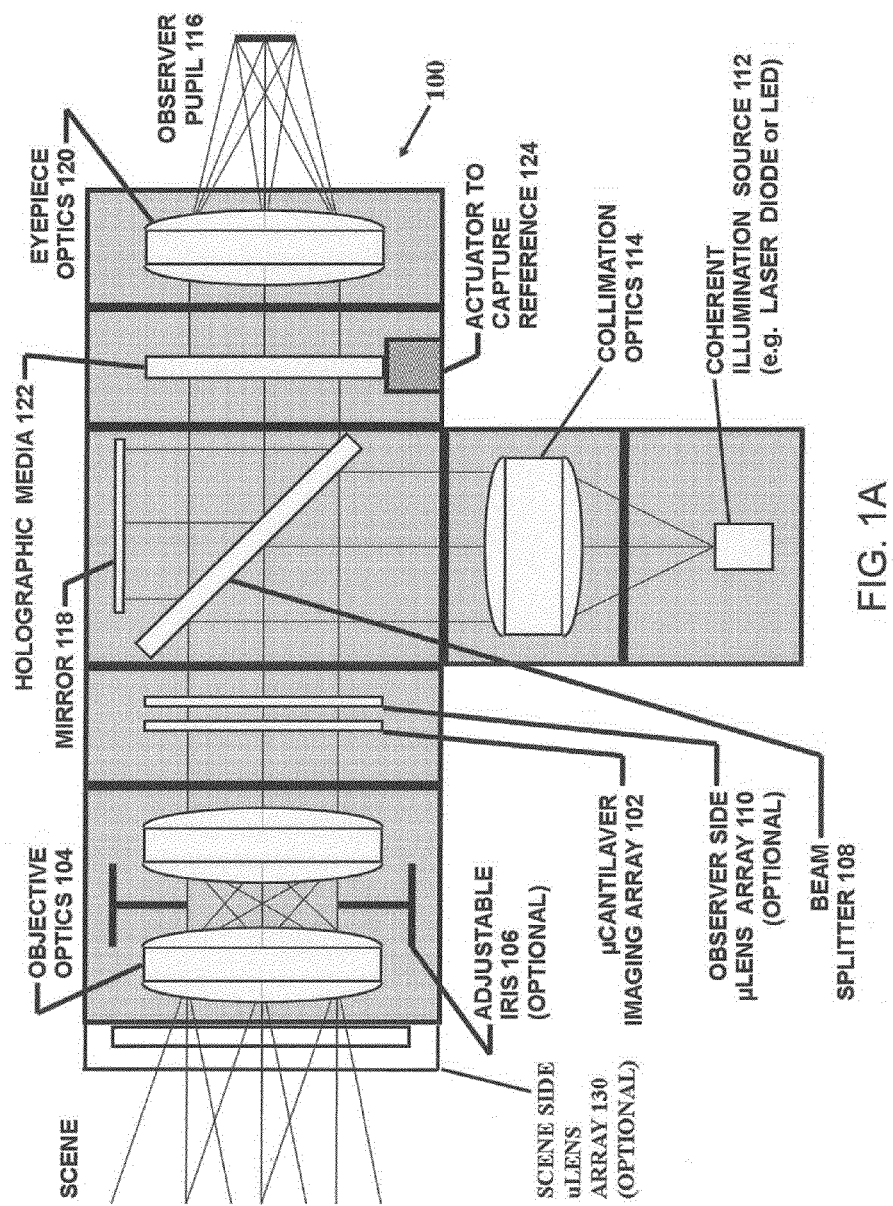
FIG. 1A is a schematic representation of an infrared viewing system consistent with an embodiment of the invention.

FIG. 1A is a schematic representation of an infrared (IR) viewing system 100 consistent with an embodiment of the invention. The optical, mechanical and electrical components may at least be partially enclosed within a housing that may be handheld, helmet mounted, vehicle mounted, tripod mounted, or weapon mounted. The system 100 may be an infrared imaging product in which an opto-mechanical device is used to measure thermal radiation and form a thermal scene image through optical measurement of thermo-mechanical motions rather than by forming a thermal scene image through electro-mechanical or electrical means. The system 100 may incorporate a thermo-mechanical infrared focal plane array having an array of microscopic mechanical devices, for example bimorph members, which convert absorbed thermal radiation energy into measurable physical displacements. In the case of an array of microscopic bimorph members (μcantilever imaging array) illuminated with thermal radiation, the members deflect in a predicable manner relative to the amount of thermal energy they are absorbing, and a user-observable image of these deformations may be created utilizing double-exposure holographic interferometry or other interferometric technique. Other interferometric techniques may include those employing phase shifting, phase stepping, Michelson, Fizeau, Linnik, Mirau, and compensated interferometric methods. Each microscopic member, typically a bimorph or component mounted through a bimorph, in the imaging array is a single detector element, comparable to a pixel on an electronic display or detector, which moves in response to changes in temperature. By measuring the movement of an array of these microscopic members, an operator can view thermal information about a scene in an opto-mechanical manner, rather than the traditional collection of thermal data at a temperature or light sensitive electronic detector array.

Infrared radiation from a scene may enter the system 100 through objective optics 104 which may incorporate an adjustable iris 106. The adjustable iris 106 may be used for gain control by constricting the amount of thermal energy reaching a μcantilever imaging array 102. A beam splitter 108 may be used to inject illumination onto either an optional observer-side μlens array 110 or the μcantilever imaging array 102 from a light source 112 and collimation optics 114. The light source, for example a red laser diode, an LED, a bandpass filtered LED, or a bandpass filtered white light source, may be behind one or more lenses to collect and form the illumination light. The illumination may or may not be collimated at the beam splitter. The beam splitter 108 may simultaneously illuminate the μcantilever imaging array 102 while allowing the μcantilever imaging array 102 to be observed by the operator 116 or a digital camera. An interferometric or holographic configuration employing off-axis techniques which do not use a beamsplitter may be employed. In one embodiment, a media reference surface, for example a mirror 118, may be used to establish the reference arm of the interferometric or holographic configuration. The media reference surface may be planar or no-planar.

The optional observer-side μlens array 110 may also be used to focus the visible light on a portion of each of the μcantilever members. The observer-side μlenses 110 may serve to focus the observer side illuminations and observations to a specific, discrete point or small area on the member creating the perception of a pixel with a single intensity level rather than an average measurement across the member. In the case of more complex bimorph geometry, the optional μlens array can serve to increase the observed fill factor of the array. The lens clear apertures on the optional observer-side μlens array 110 may be square, circular, hexagonal, or other shape to best conform to the μcantilever imaging array. In one embodiment, the light illumination of the observer side of the μcantilever imaging array 102 may be convergent or divergent entering the μlens array. The light illuminating the μcantilever array 102 from the observer-side μlens array may be focused to a tight spot or defocused to a small area. These parameters may be adjusted to set the viewable angle from which an operator or digital camera can observe the resulting scene image. Additionally, these parameters may be adjusted to wash out manufacturing imperfections, contamination, scratches, or other defects on the μcantilever imaging array 102. The system 100 may also have eyepiece optics 120 for magnifying, focusing, or otherwise preparing the image for an operator 116. The mechanism for capturing interferometric or holographic data may be physical, for example a wet processed holographic plate or erasable thermophotoplast, or electronic, in the form of a camera and display. Additionally, an optional scene-side μlens array 130 may be used to focus incoming radiation on a portion of each of the μcantilever members.

Figure 1B:
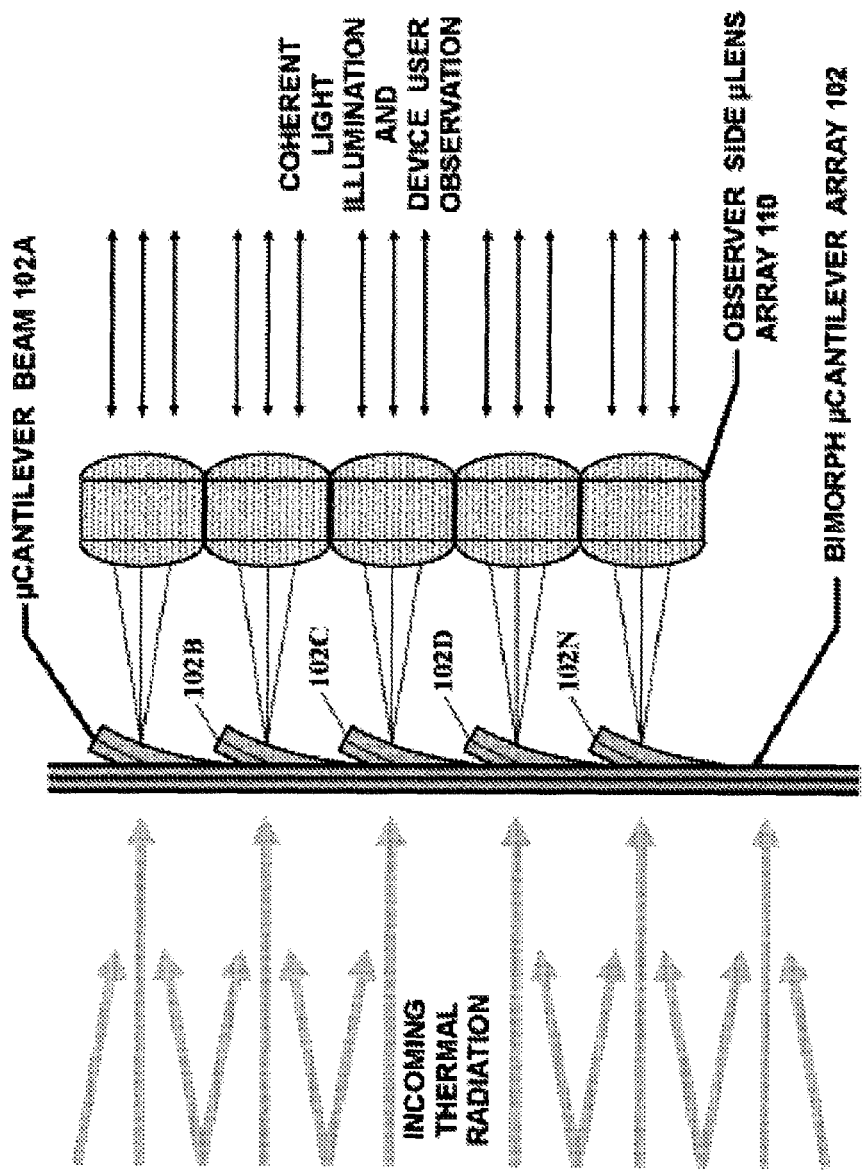
FIG. 1B is a more detailed schematic of a μcantilever array and optional observer-side μlens array component of the infrared viewing system of FIG. 1A.

FIG. 1B shows a simplistic implementation of μcantilever members 102A-N comprising two different materials bonded together, where those two materials have different coefficients of thermal expansion. As the temperature of the μcantilever members 102A-N change, the two bonded materials will expand or contract at different rates causing the material to bend/distort. If the temperature drops, the bimorph material will bend in the direction of the higher coefficient of thermal expansion material. If the temperature increases, the bimorph material will bend in the direction of the lower coefficient of expansion material. If the temperature remains stable, the bimorph material will remain static. Real world implementations of the μcantilever array 102 may include features to maximize optical fill factor, isolate individual μcantilever members from the environment and each other, and otherwise improve the efficiency and precision of the device. The μcantilever members 102A-N can be delicate, fragile, and sensitive and may therefore be encased in a vacuum or inert gas enclosure to prevent or limit interference from air. The enclosure might be such that the interference from the gas surrounding the μcantilever members 102A-N occurs in a predicable manner and can be compensated for using electrical, mechanical or optical means. Some form of compensators to adjust for coarse temperature changes in the environment may be employed to increase the operational temperature range of the device. These compensators could be static features incorporated into the μcantilever array 102 itself, such as the use of very low coefficient of thermal expansion materials, for example Invar or Silicon carbide, to anchor the μcantilever members 102A-N, or passive mechanical features such as bimorph structures incorporated into the μcantilever array 102 to counteract the effect of uniform temperature changes. In one embodiment, some form of active electronic or thermal control, for example a thermo-electric cooler or piezo-electric actuator mechanism, may be incorporated to stabilize the environment around the μcantilever members 102A-N. In another embodiment, the array 102 could consist of a symmetric triple stack of materials that is mechanical stable over temperature, with areas etched or machined out to create localized bimorph structures. The μcantilever array 102 may have the individual beams arranged in rows and columns or on some other grid pattern, such as a hexagonal or circular array. To maximize the sensitivity of these μcantilever members 102A-N to the holographic interferometry setup, the observed surface of the members 102A-N may be coated with a plain, light colored, matte finish with a very predicable and uniform reflectivity. In another embodiment, the observed surface of the members 102A-N may be mirrors.

Figure 2:
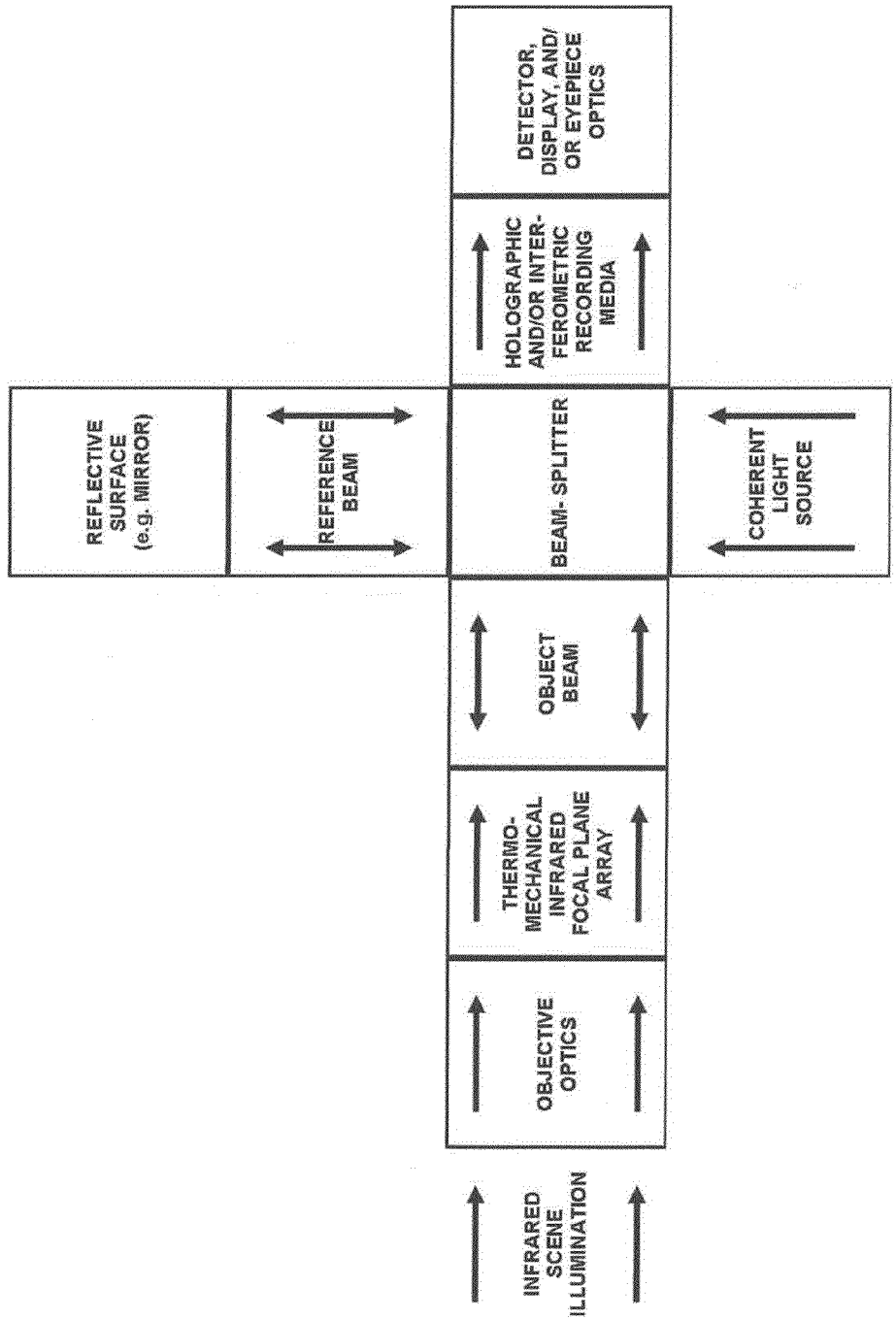
FIG. 2 is a schematic representation of the infrared viewing system of FIG. 1A for acquiring a holographic or interferometric image consistent with an embodiment of the invention.

FIG. 2 is a schematic representation of the infrared viewing system 100 of FIG. 1A showing how an interference pattern may be generated from the μcantilever imaging array 102 consistent with an embodiment of the invention. Using double-exposure holography (DEH) or double-exposure interferometry (DEI), a reference hologram or interferogram of a scene may be captured on holographic, photographic, photothermoplast, photorefractive, or electronic media 122. When a second captured or live image is compared to the reference hologram or interferogram, the observer will see changes in illumination representing changes in cantilever member positions from the reference state as captured on the reference hologram. DEH and DEI work by initially capturing with holographic or interferometric media, which could be optical or digital electronic, a reference interference pattern generated by coherent light reflecting off an object, referred to herein as the object beam, interfering with a coherent reference light, referred to herein as the reference beam. This reference interference pattern is then overlapped or combined with a second interference pattern, which could be either captured or live, reflecting off the same object in a new state. The overlapped or combined reference and second interference patterns form a new interference pattern which can be observed directly through photographic media or electronically with the aid of a digital camera and display. As the object moves from its base shape, the intensity of the light from each of the μcantilever members 102A-N changes in a sinusoidal manner. These changes in intensity represent microscopic motions of the μcantilever members 102A-N that are in the order of magnitude of the wavelength of the illumination light, and these changes can be readily interpreted by a device operator as thermal differences in the observed scene. The intensity variations result from changes in the distance light travels between the reference state and the new state of the µcantilever members 102A-N. For example, if the portion of a µcantilever member being measured moves 160 nm and it is being illuminated by 640 nm light, then the µcantilever member has moved ¼ of a wavelength of the illumination light. Since the light travels in double-pass, that is it travels to the µcantilever member and then back again, the total change in distance the light travels in this example is ½ of the wavelength of the illumination light. A ½ wavelength motion is sufficient to cause the intensity to shift from bright to dark, dark to bright, or gray back to gray. This approach is an interferometric technique and relies on coherent light and a stable opto-mechanical system.

The system 100 may have to be recalibrated from time-to-time by pointing the objective optics of the infrared viewing system 100 at a uniform infrared scene, for example a wall, lens cap, or internal shutter having a uniform or known temperature and emissivity. This recalibration accomplishes the goal of capturing a new reference state. Each time the system 100 is recalibrated a new reference state is stored. The user may actuate the holographic recording media 122 with an actuator 124 to acquire a fresh reference hologram when desired. For example, the holographic media 122 may be a resettable photothermoplast material which utilizes an electric charge and temperature to reset and acquire a new reference state or a photorefractive material which utilizes an electric charge and light to reset and acquire a new reference state. A wet plate holographic process may alternatively be used with actuators or other compensators employed to restore a usable reference state. The holographic recording media 122 may also be in the form of a digital camera, in which case actuators to step the phase of the interferometric image may be incorporated to improve measurement accuracy.

When using a photographic, photothermoplast, photorefractive, or wet developed holographic plate, it may be possible to directly view the results of the DEH or DEI process without any digital capture and electronic displaying of the image. In this configuration the reconstructed reference interference pattern is overlapped on top of the live interference pattern.

Thermophotoplast and photorefractive materials exist which can be erased with an electronic charge, temperature, and/or light allowing for periodic recalibration of the device. With these materials, an electronic charge circuit would be incorporated into the device and may require additional illumination or some form of heating devices. These thermophotoplast materials generally have a limited number of cycles over which they can be erased, typically in the hundreds or thousands. This limitation could be resolved by allowing for the thermophotoplast plate to be a replaceable component. A replacement thermophotoplast material may not require any form of optical alignment; however it may need to be mounted in a stable manner such that it doesn't move relative to the other components after a reference image is captured. If photorefractive materials are used, they may also be a replaceable component.

The holographic and/or interferometric recording media can be a digital camera in an electro-optic holography (EOH) or interferometric (EOI) configuration. The reference state may be recorded in electronic format and then compared to an electronically captured scene image using a processor and then displayed on a display for viewing by an operator or output through some form of video output mechanism such as a video output port or display. This digital approach differs from the photographic approach in that the comparison of the live and reference interference patterns occur in an electronic processor rather than on physical holographic media in the photographic approach. The EOH and EOI approaches may require the use of an electronic image capture device, computational processor, and electronic display device. To improve the precision of an electronic capture approach, a phase stepping or splitting component may be added to support sophisticated phase measuring techniques. For example, a phase stepping component might consist of a piezoelectric actuator and a phase splitting component might consist of a few beam splitting cubes combined to illuminate different portions of the detector with images that are slightly out of phase with each other.

Figure 3A:
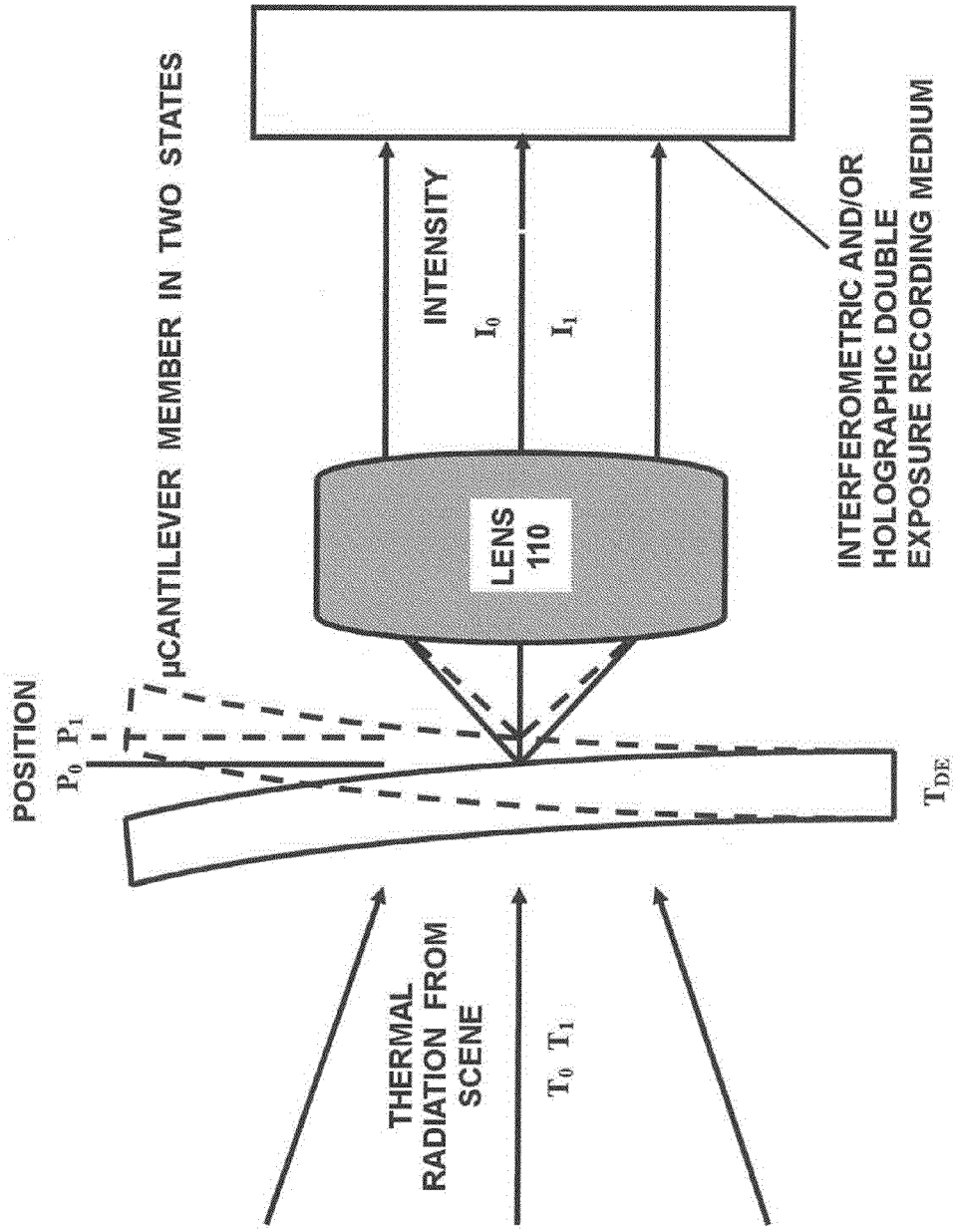
FIG. 3A is a schematic representation of a μcantilever array element shown in a first and a second position with an optional single observer-side μlens array element of the infrared viewing system of FIG. 1A.

FIG. 3A is a schematic representation of a single µcantilever member shown in a first and a second position with a single observer-side µlens 110 from the infrared viewing system of FIG. 1A. Two µcantilever member states are shown corresponding to two different environmental conditions. As the position of the µcantilever member changes, the phase recorded at the interferometric, holographic double exposure, or holographic real time recording medium also changes. The phase at the interferometric, holographic double exposure, or holographic real time recording medium repeats when the observed member location moves a distance equal to roughly half a wavelength of the coherent illumination source. For example, if 650 nm light is used as a coherent illumination source, then the phase at the recording medium will repeat for every ~325 nm change in position of the µcantilever member. The precise distance over which the phase repeats is a function of the system geometry, however if the beams are being viewed roughly perpendicular to their direction of motion the phase repeats for motions that are roughly ½ a wavelength of the illuminating light. The variables $T_0$ and $T_1$ represent the thermal radiation from the scene in the reference and active states respectively. The variables $P_0$ and $P_1$ represent the observed position of the µcantilever member in the reference and active states respectively. The variables $I_0$ and $I_1$ represent the observed intensity and/or phase condition resulting from the interferometric and/or holographic combination of the object and reference beams in the reference and active states respectively. $I_0$ and $I_1$ are not the absolute intensity of the light reflecting off the µcantilever member but instead are the fringe intensity on the interferometric or holographic device. The variable $T_{DE}$ represents the ambient thermal device environment. The µcantilever member in this illustration is shown as a simplistic beam for illustrative purposes. Other µcantilever member geometries may be used without departing from the invention.

Figure 3B:
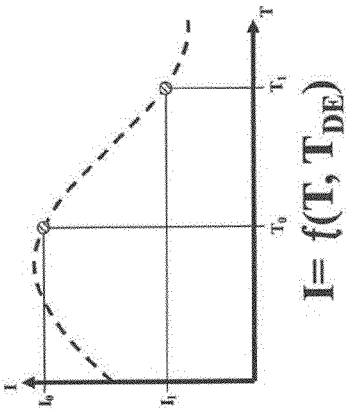
FIGS. 3B, 3C and 3D show the relationships between beam intensity, μcantilever position, and temperature for the infrared viewing system of FIG. 1A.
Figure 3C:
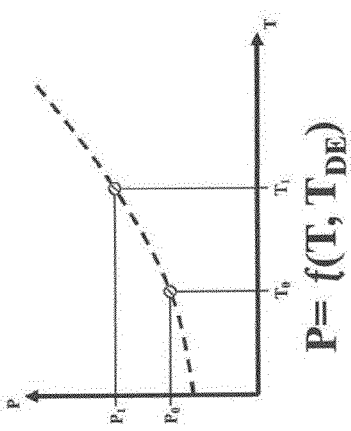
Figure 3D:
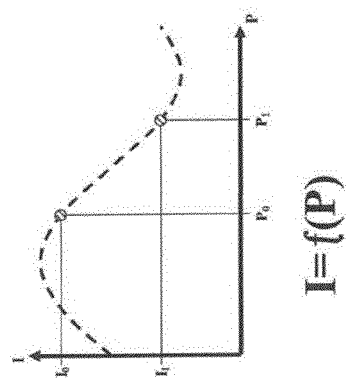

FIG. 3B shows the typical sinusoidal relationship between interferometric/holographic fringe intensity and µcantilever member position for the infrared viewing system of FIG. 1A. FIG. 3C shows the typical position of a µcantilever member as a function of scene temperature as well as the ambient thermal device environment. FIG. 3D shows the combination of FIG. 3B and FIG. 3C, where fringe intensity is a function of scene temperature as well as the ambient thermal device environment. Since intensity is a function of beam position and beam position is a function of scene temperature, intensity is therefore a function of scene temperature.

The relationship of interest is that between active intensity $I_1$ and active scene temperature $T_1$, so a variety of active and passive mechanisms are used to remove the effects of the ambient thermal device environment $T_{DE}$ which interfere with measuring that relationship of interest. These steps can include active temperature control of the μcantilever array, recalibration of the device when changes in the ambient thermal device environment occur, and compensation using inputs such as temperature sensors in the thermal imaging device. The measurement methodology here is that the intensity observed by the device mechanism and/or recording medium will be converted to a representative image of the thermal emission from an area of the scene being observed with the device.

Figure 4:
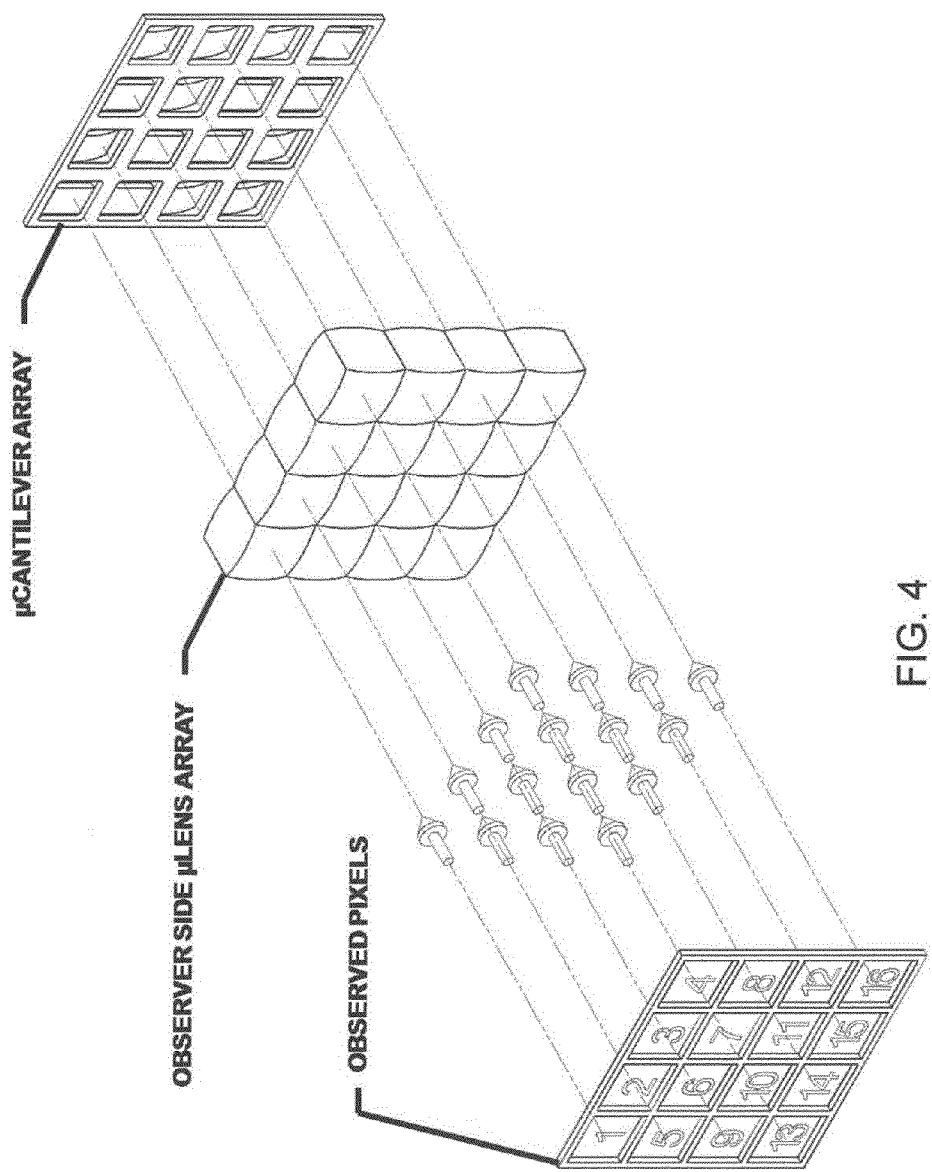
FIG. 4 is a graphical illustration of a 16 element infrared viewing system showing how the system sees individual μcantilever members as infrared scene pixels consistent with an embodiment of the invention.

FIG. 4 is a graphical representation of a 16 element (pixel) infrared viewing system showing how an embodiment of the system may see individual μcantilever beam/members as infrared scene pixels. As the thermal radiation from the scene and device environment changes, the positions of the members in the μcantilever array will move in a predictable manner as illustrated in FIGS. 3A and 3B. The optional observer-side μlens array 110 allows for the observation of a discrete point or area on the μcantilever members 102A-N to improve the deterministic nature of the measurement. The measurements taken either directly from the μcantilever array 102 or through the observer-side μlens array 110 form the basis of the thermal image map acquired by the device. Each μcantilever member viewed through a μlens array element may make up a single pixel of the captured image.

Figure 5A:
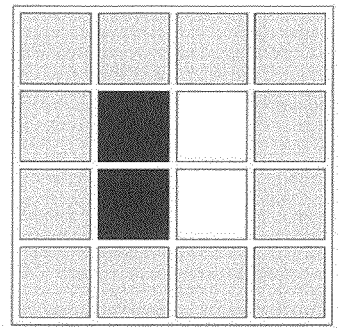
FIGS. 5A-5C show how when some μcantilever elements move, the observed phase shifts.
Figure 5B:
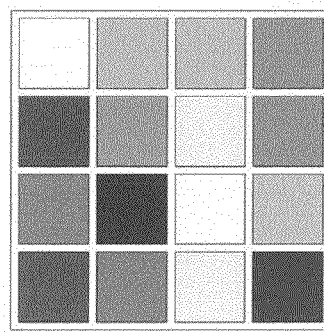
Figure 5C:
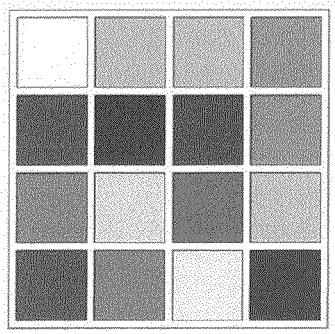

FIG. 5A shows how the 16 fringe intensities measured from the 16 μcantilever members of FIG. 4 may look when capturing a reference state. The intensities of the 16 squares represent different phase states as measured from the μcantilever members. Observation geometry, manufacturing tolerances, device configuration, and other parameters can all affect the reference location of μcantilever members 102A-N resulting in the somewhat random nature of the observed reference phases. When the array is exposed to a live scene, the fringe intensities measured from the 16 μcantilever members may change as shown in FIG. 5B. By calculating the amount of change in phase between FIG. 5A and FIG. 5B, an image map of how much each μcantilever member 102A-N moved can be produced. As the motion of the μcantilever members 102A-N is representative of the thermal radiation from areas of the scene under observation, the data in FIG. 5C becomes representative of a thermal image of the scene. In this example, when the thermal imaging device was exposed to a scene, the central four pixels move by various amounts indicating that the thermal radiation impacting those pixels had changed from the reference state to the active or live state. For example, if the intensity and/or phase state of a μcantilever/μlens array member is measured to be α in the reference state and the intensity and/or phase state of that same μcantilever/μlens array member is measured to be β in the active state, then the change representative of intensity of thermal radiation of the portion of the scene imaged onto that μcantilever member is (β−α). The 12 pixels around the perimeter of the image do not show any change, indicating either no motion or motions that are some multiple of approximately half the wavelength of the illumination light source being used, for example 325 nm motion if 650 nm illumination light is used.

Figure 6A:
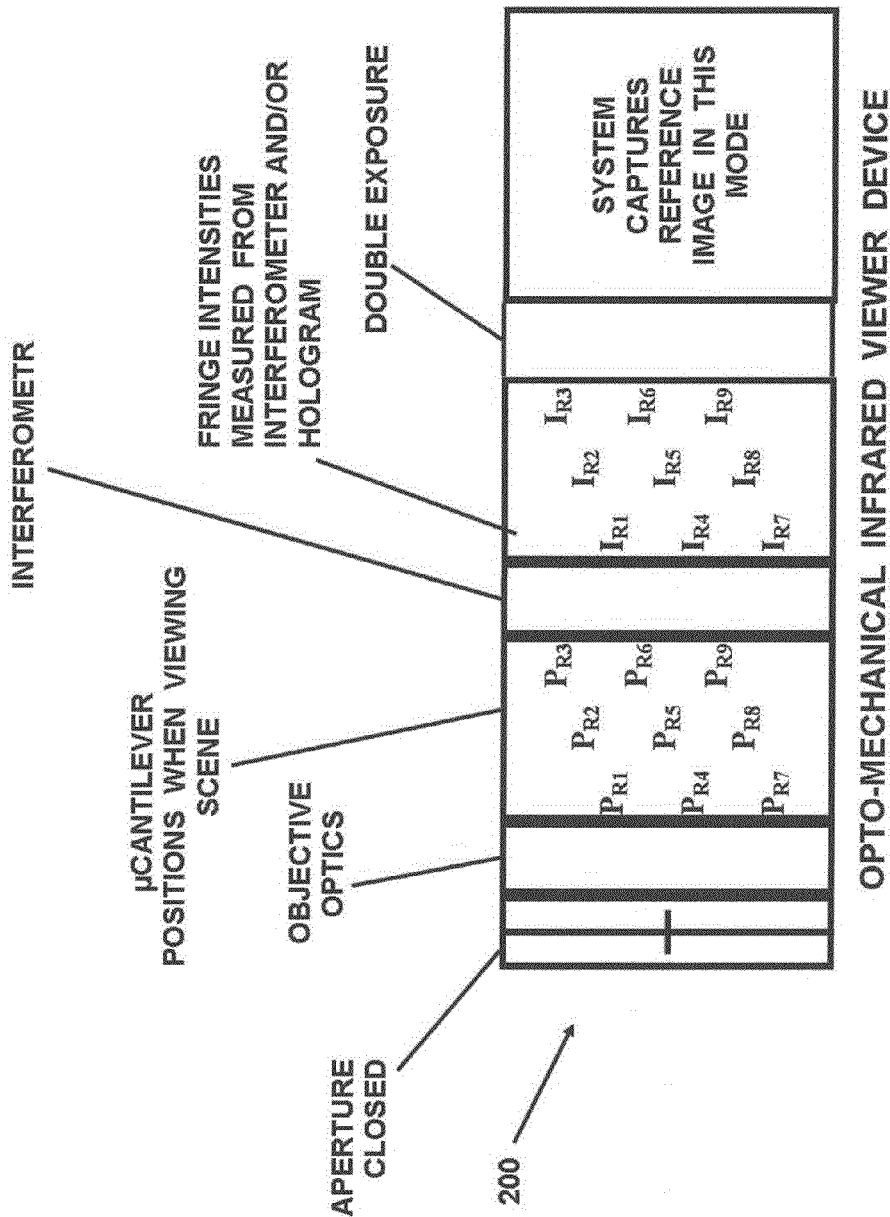
FIG. 6A is a schematic representation of a 9 element infrared viewing system in a calibration mode consistent with an embodiment of this invention.

FIG. 6A is a schematic representation of an infrared viewing system 200 in a calibration and/or reference state capture mode consistent with an embodiment of the invention. In this mode the μcantilever member locations when exposed to a known reference input (a closed aperture in this case) is recorded. Nine elements are represented in the schematic. The number of elements in a functional thermal imager would be far greater than 9 or 16, the small numbers of elements in these schematics are being used for illustrative purposes only. $P_{R1}$ through $P_{R9}$ represent the observed reference positions of the μcantilever array members. $I_{R1}$ through $I_{R9}$ represent the observed fringe intensities/phase states resulting from the μcantilever array member positions.

Figure 6B:
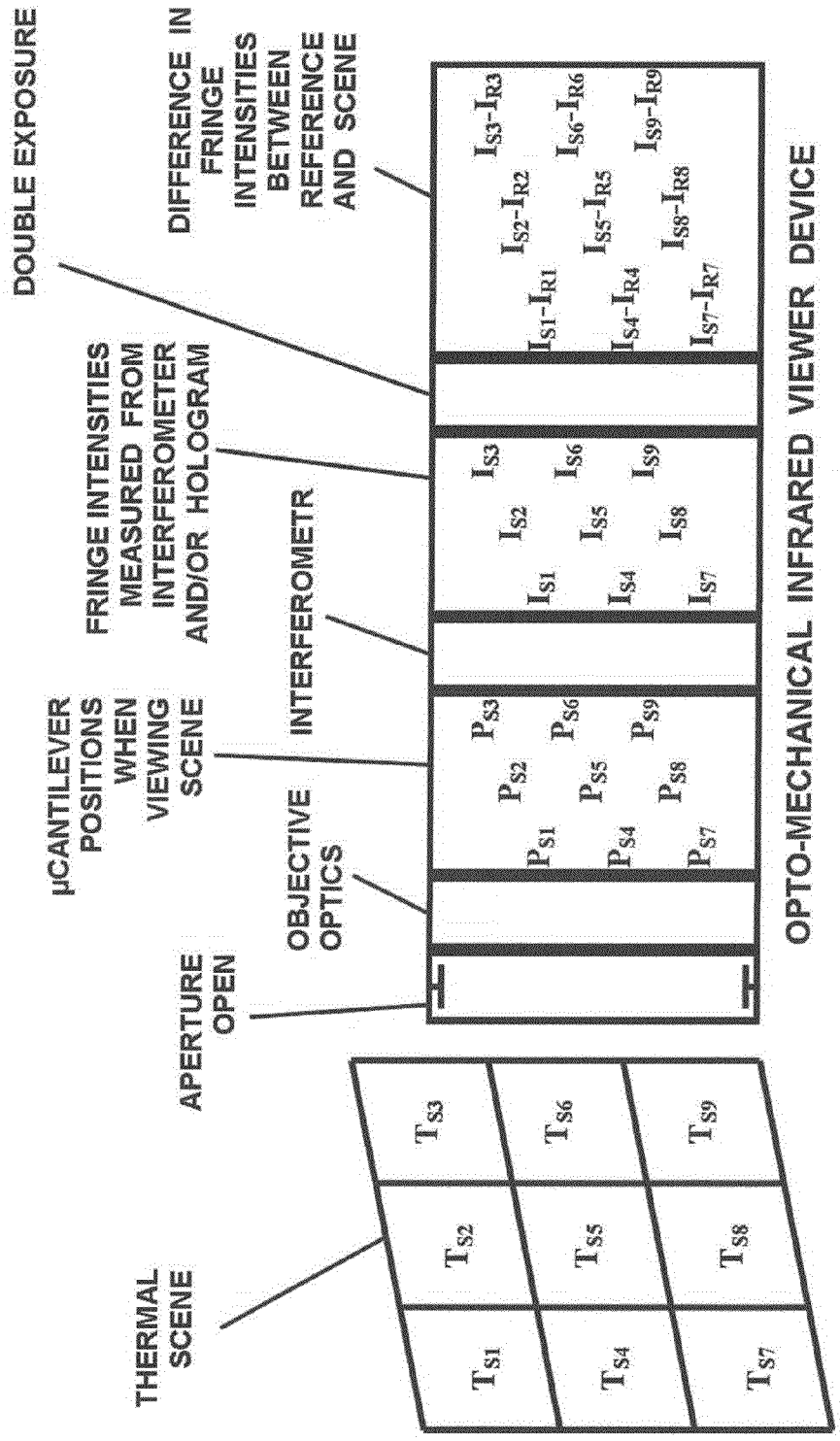
FIG. 6B is a schematic representation of a 9 element infrared viewing system in a scene observation mode consistent with an embodiment of this invention.

FIG. 6B is a schematic representation of the infrared viewing system 200 in a scene observation mode consistent with an embodiment of this invention. In this mode the thermal radiation from the scene influences the μcantilever members causing their positions to shift. The thermal radiation from the scene is represented as $T_{S1}$ through $T_{S9}$. Now the positions of the μcantilever array members are $P_{S1}$ through $P_{S9}$ and the fringe intensities/phase states are now $I_{S1}$ through $I_{S9}$. The information of interest to the device user is the differences between the reference and active states, which in this example is $(I_{S1}-I_{R1})$ through $(I_{S9}-I_{R9})$. In this manner, the variations in thermal radiation in the scene allows for measurements to be made such that an image of that thermal radiation scene profile can be made.

Figure 7A:
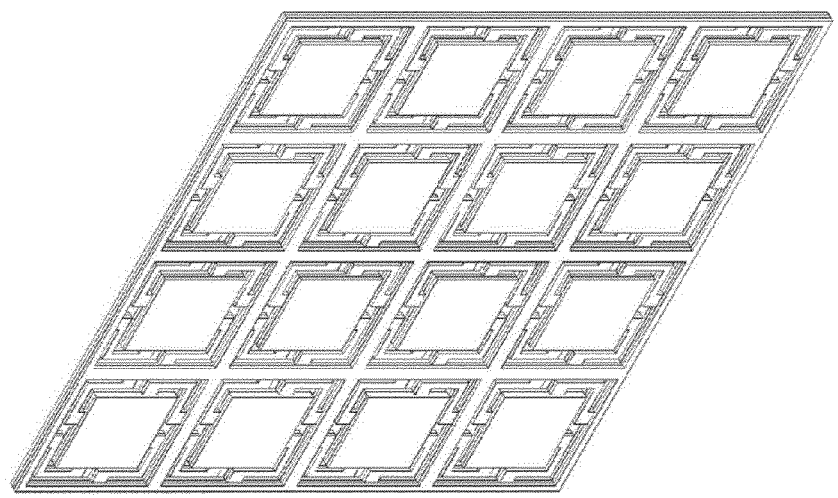
FIG. 7A is a graphical illustration of an alternative embodiment of a 16 element μcantilever array. In this embodiment, plates are suspended by four μcantilever bimorph elements.
Figure 7B:
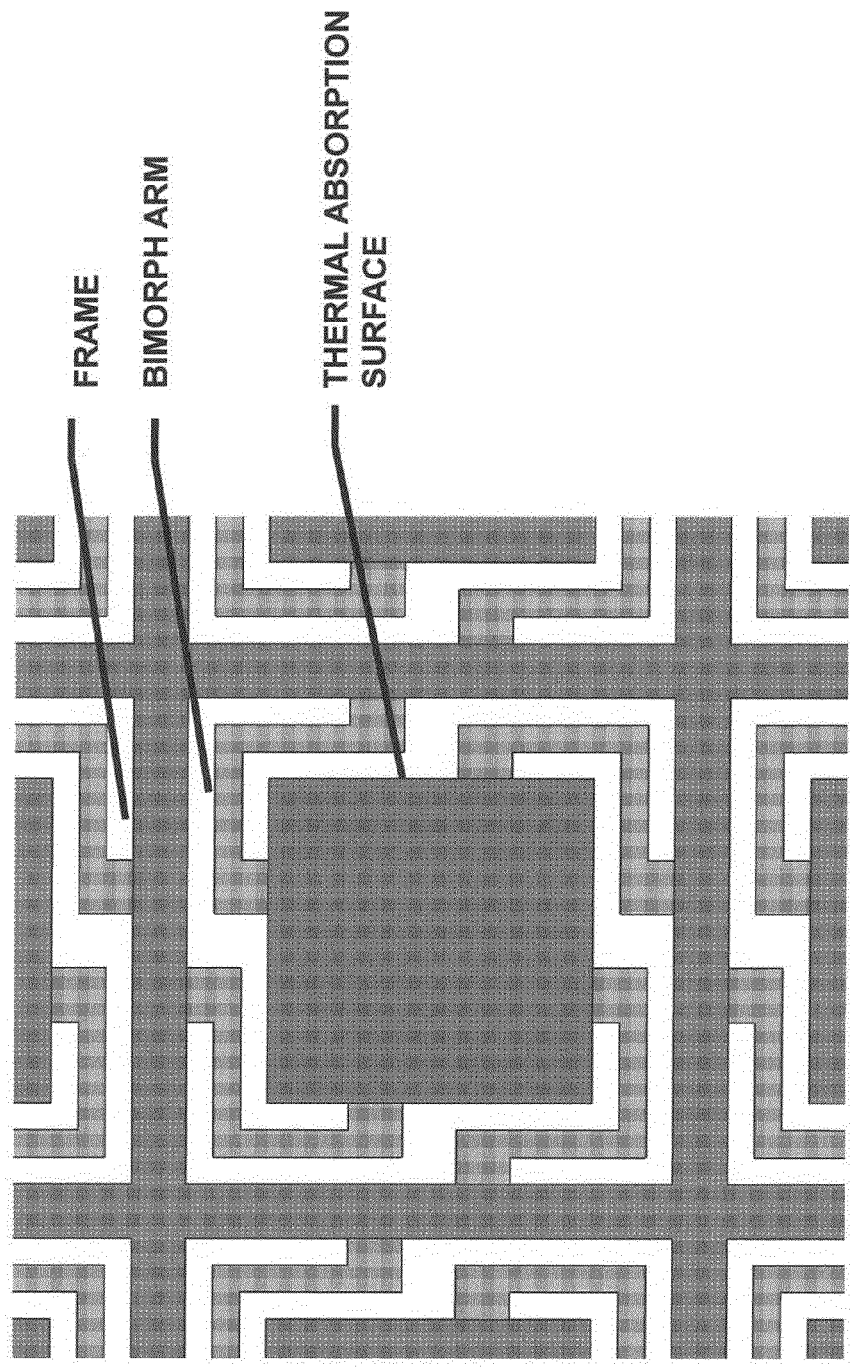
FIG. 7B is a front view of an element from the μcantilever array shown in FIG. 7A.

As previously mentioned, the actual geometry of the μcantilever members may be substantially more complex than the simple geometry shown in FIGS. 1B, 3A, and 4. FIG. 7A shows a 16 element array of a slightly more complex geometry with features incorporated to improve the performance of the thermal imaging device. FIG. 7B shows a frontal view of a single element from FIG. 7A. In this geometry, a flat plate is constrained by four bimorph arms attached to a frame. As the bimorph arms flex due to changes in the thermal environment, the flat plate is translated out of plane. Such a geometry provides a flat area from which to make translation measurements rather than the section of sloped beam area the more simplified geometry would have provided. Such a structure might be manufactured from a three or more layer sandwich in which one layer is stripped away to create the bimorph arms. In other words, some areas might be an A-B-A symmetric stack that is insensitive to temperature changes while others have a layer stripped off to be a temperature sensitive B-A bimorph stack. Again, additional complexity is anticipated to improve the thermal stability and isolation of the members.

Figure 8:
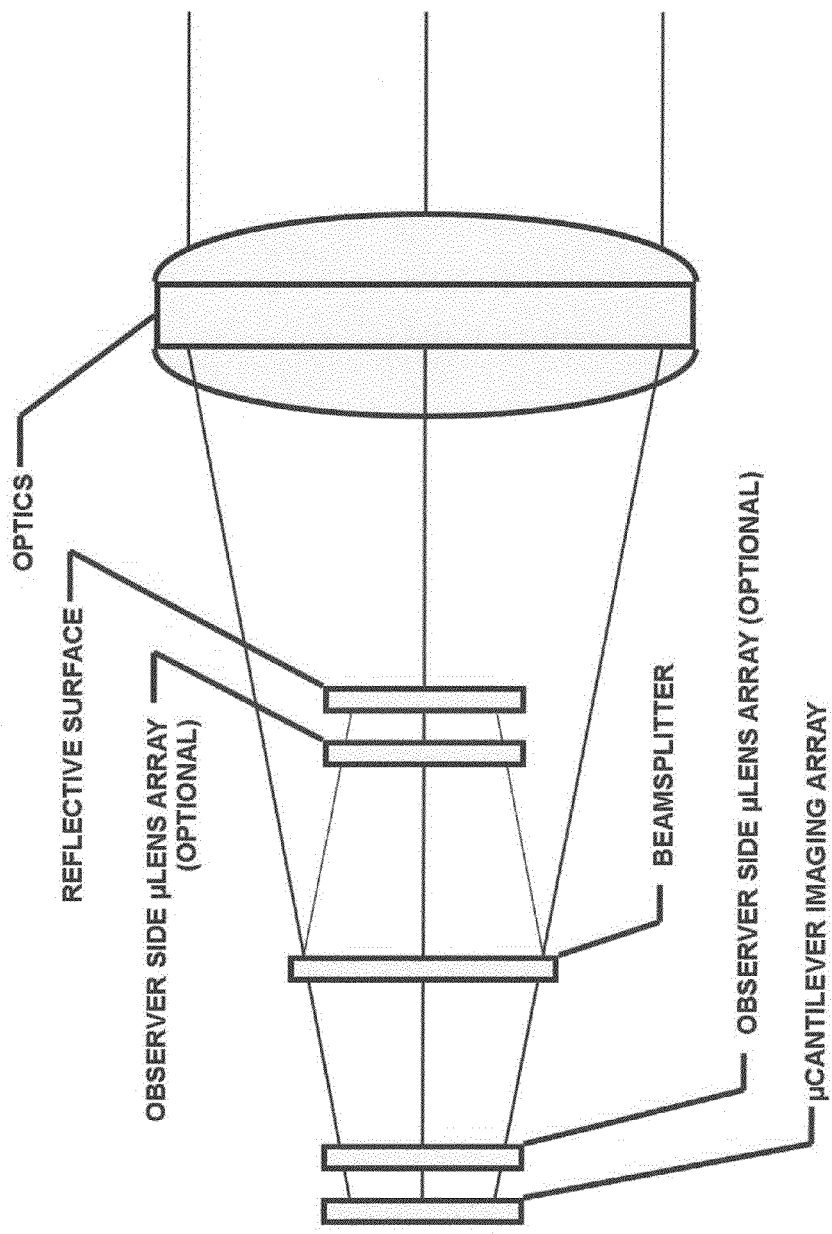
FIG. 8 shows an alternative Mirau style embodiment of the dual-arm interferometric setup illustrated in FIG. 1A.

The interferometric and/or holographic systems illustrated in FIG. 1A and 2 are of a classic dual-arm or Michelson styles. Other interferometric and/or holographic configurations may be used in various embodiments of this invention. FIG. 8 shows one of these alternative embodiments, a hybrid Mirau/Compensated configuration for observing the μcantilever members.

The system 100 may require a stable mechanical platform upon which to operate. Since this system involves measuring small changes in the path length light travels from the illumination source to the holographic media, any mechanically induced changes in that path length due to warping, temperature changes, or any other effect may cause the image viewed by the device operator and/or digital image capture device to change. A stable optical bench, perhaps one made of a low CTE material such as Invar, may be used. Alternatively, a phase offset adjustment may be called for which makes very small (on the order of tens of nm) adjustments in the path length the laser light travels. Electronic compensation based on feedback from sensors (e.g. a temperature sensor) may also be employed to reduce environmental effects on the thermal image quality.

Figure 9:
FIG. 9 shows examples of simulated images from an embodiment of this invention at different gain settings to illustrate fringe wrapping at high gain settings.
Figure 9:
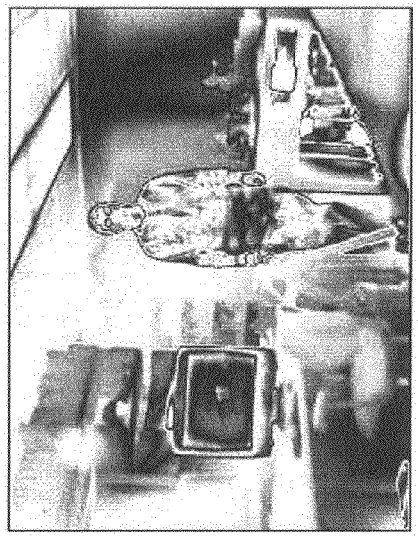
Figure 9:
Figure 9:
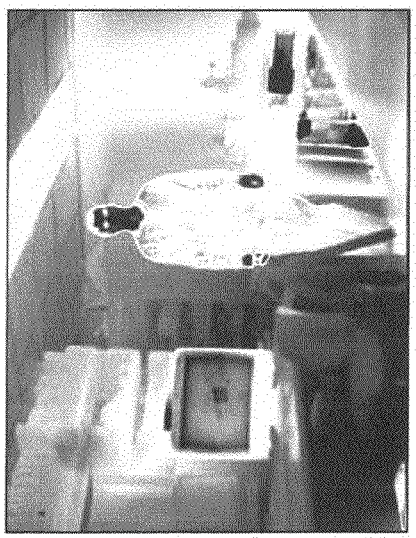

FIG. 9 shows a simulated image from an embodiment of this invention at four different gain settings. If the gain of the imager 100 is set in a particular manner, the observed scene image may be similar as that from a traditional thermal camera. A difference occurs when the dynamic range of the "first fringe" of the infrared viewing system is exceeded, in which case a fringe wrapping phenomenon occurs. When fringe wrapping occurs, rather than shades changing from light to dark corresponding to a temperature gradient, the temperatures will repeatably change in response to a temperature gradient. That is, the shades may go from light to dark to light to dark to light, etc. over the temperature gradient as the fringes wrap. The gain of the device could be adjusted through several mechanisms, such as by changing the aperture, F-number, wavelength or other optical parameters through mechanical, electrical, or optical means. The design of components such as the μcantilever array could be strongly influenced by gain considerations.

Figure 10:
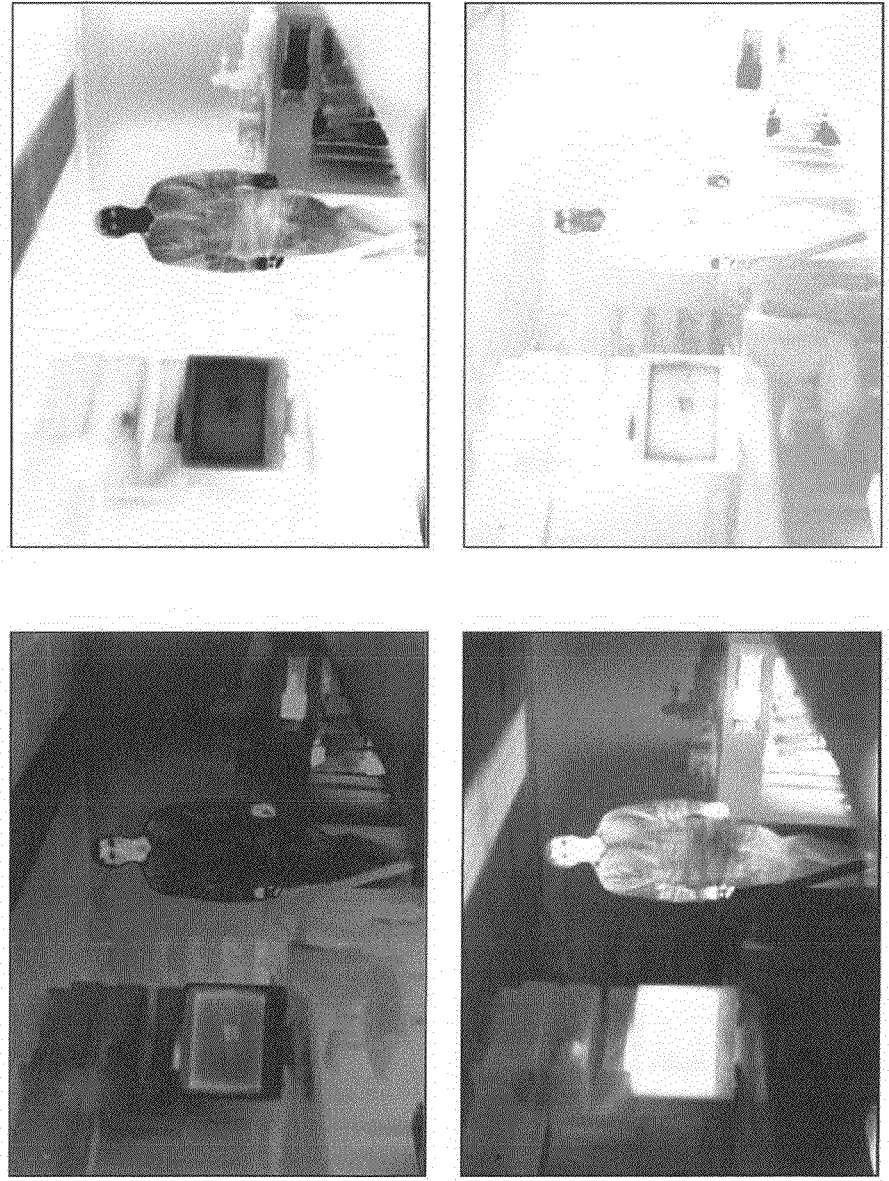
FIG. 10 shows the same simulated image from an embodiment of this invention where the base phase of the image is shifted.

FIG. 10 shows a simulated image from an embodiment of this invention with four different phase shifts. If there is a uniform change in the path length the light travels, perhaps due to thermal expansion of the infrared viewing device optical bench, the phase of the image will change and compensation and/or correction for such changes may be needed. The corrections may include active micropositioners, electronic compensation, and/or the recapturing of a reference state to recalibrate to the new conditions.

The double-exposure embodiment of the invention presented here has advantages over a traditional single capture interferometric or holographic device when it comes to measuring μcantilever member locations. A single-exposure device is limited by uncertainties and irregularities in the measurement system, for example irregularities in the thickness of the μcantilever members, and usually requires the object under observation to be flat to the point of having a nearly mirror like surface. When making position measurements of μcantilever members that are not precisely manufactured to be aligned into the same plane, a noise like degradation in the measurement accuracy of such a device will be observed in a single-exposure device. The double exposure or real time holographic/interferometric approach can resolve the issue of uncertainties and irregularities by first characterizing and then subtracting out the influence of those uncertainties and irregularities. In short, unlike a double-exposure approach, a single-exposure approach lacks the ability to calibrate out environmental, optical, electronic, and mechanical imperfections in a thermal imaging device.

Although several embodiments have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed:

1. An imaging system, comprising:
    a housing for providing protection to internal components, the housing having an objective end and a viewing end;
    a source of coherent light;
    a detector array of thermo-mechanical members, the members having a first side oriented towards the objective end and a second side oriented towards the viewing end;
    a holographic media disposed between the detector array of thermo-mechanical members and the viewing end;
    an optical element configured to split the coherent light into a first light path directed towards the second side of the detector array of thermo-mechanical members and a reference light path directed towards a media reference surface.

2. The imaging system of claim 1, wherein the optical element is a beam splitter.

3. The imaging system of claim 2, further comprising a mirror aligned in the reference light path to direct light passing through the beam splitter back towards the beam splitter and then toward the holographic media.

4. The imaging system of claim 2, further comprising compensation optics in the reference light path to balance the optical path length between the beam splitter and detector array of thermo-mechanical members in the first light path.

5. The imaging system of claim 2, further comprising compensation optics in the object beam light path to balance the optical contrast between the beam splitter and detector array of thermo-mechanical members in the first light path.

6. The imaging system of claim 1, wherein the optical element is an interferometer.

7. The imaging system of claim 1, further comprising a surface in an object beam light path with a reflectivity and surface texture appropriate to maximize the fringe contrast from the detector array of thermo-mechanical members.

8. The imaging system of claim 1, wherein the holographic media is a resettable photothermoplast.

9. The imaging system of claim 1, wherein the holographic media is a resettable photorefractive.

10. The imaging system of claim 1, wherein the holographic media is a fixed holographic plate.

11. The imaging system of claim 1, wherein the holographic media is an electronic digital camera.

12. The imaging system of claim 1, further comprising an actuator coupled to a charge circuit for creating a reference holographic or interferometric phase state.

13. The imaging system of claim 1, wherein the array of thermo-mechanical members, the optical element and the holographic media are disposed along an optical path between the objective end and the viewing end.

14. The imaging system of claim 13, further comprising a lens cap sized to engage the objective end, the lens cap providing a uniform or known infrared target surface.

15. The imaging system of claim 13, further comprising a shutter to engage the objective end, the shutter providing a uniform or known infrared target surface.

16. The imaging system of claim 1, further comprising an eyepiece disposed between the holographic media and the viewing end to allow direct viewing.

17. The imaging system of claim 1, wherein the system records a reference phase state with either interferometric or holographic techniques, and where this reference phase state is compared with phase states recorded at a later time so as to measure changes in the positions of the detector array of thermo-mechanical members.

18. The imaging system of claim 1, wherein a user looks through a hologram media towards the second side of the detector array of thermo-mechanical members.

19. The imaging system of claim 1, further comprising a lens array disposed between the second side of the detector array of thermo-mechanical members and the holographic media.

20. The imaging system of claim 19, further comprising an adjustable iris in series with the objective lens assembly.

21. The imaging system of claim 1, further comprising a lens array disposed between the objective end and the first side of the detector array of thermo-mechanical members.

22. The imaging system of claim 1, further comprising an objective lens assembly near the objective end.

23. The imaging system of claim 1, wherein the detector array of thermo-mechanical members comprises a plurality of bimorph members, the bimorph members configured to bend in proportion to the amount of thermal energy received thereon.

24. The imaging system of claim 1, wherein the detector array of thermo-mechanical members comprises components suspended by a plurality of bimorph members, the bimorph members configured to translate the components in proportion to the amount of thermal energy received thereon.

25. The imaging system of claim 24, wherein double-exposure holography interferometry is utilized to view the image representative of the thermal radiation of the scene.

26. The imaging system of claim 1, further comprising a mechanism which can be actuated for forming a first holographic or interferometric phase state.

27. The imaging system of claim 1, wherein an image representative of the thermal radiation of a scene is formed when a viewer looks through a holographic media and onto the second side of the detector array of thermo-mechanical members.

28. The imaging system of claim 1, wherein the source of coherent light is redirected by an optical element to illuminates the second side of the detector array of thermo-mechanical members.

* * * * *